ber: 5,150,883
United States Patent [19]
Cook-Martin

[11] Patent Number: 5,150,883
[45] Date of Patent: Sep. 29, 1992

[54] FLUID MECHANICS DEVICES

[75] Inventor: David M. Cook-Martin, Rawtenstall, England

[73] Assignee: Unilab Holdings, Ltd., Lancashire, England

[21] Appl. No.: 634,124

[22] PCT Filed: Jul. 5, 1989

[86] PCT No.: PCT/GB89/00757
§ 371 Date: Dec. 31, 1990
§ 102(e) Date: Dec. 31, 1990

[87] PCT Pub. No.: WO90/00695
PCT Pub. Date: Jan. 25, 1990

[30] Foreign Application Priority Data
Jul. 5, 1988 [GB] United Kingdom ............... 8815923

[51] Int. Cl.⁵ .............................................. F16K 31/00
[52] U.S. Cl. ....................................... 251/367; 251/366
[58] Field of Search ................................. 251/367, 366

[56] References Cited
U.S. PATENT DOCUMENTS

| | | | |
|---|---|---|---|
| 3,384,122 | 5/1968 | Harpmann | 251/367 |
| 3,989,058 | 11/1976 | Jackson et al. | 251/367 |
| 4,401,293 | 8/1983 | Rodewald et al. | 251/367 |

Primary Examiner—A. Michael Chambers
Attorney, Agent, or Firm—Richard E. Jenkins

[57] ABSTRACT

The invention provides a variety of fluid mechanics devices such as fluid-flow valves; piston and cylinder devices; fluid-flow restrictors; fluid reservoirs and fluid-flow manifolds. The devices are build up from stacks of wafer-like components. Which preferably are transparent and in each case, at least one of those components comprises an axial port and a radial port communicating with the axial port, there being concentric annular recesses in the faces of the component to receive an outer "O" ring type static seal between two mating components, and an inner "O" ring dynamic seal which acts between the wafer component and a vale rod piston rod, spindle or like device extending through the aligned axial ports of all the wafer components. Beside provide the double seal (static and dynamic) the arrangement also permits of great versatility of assembly.

9 Claims, 6 Drawing Sheets

FLUID MECHANICS DEVICES

The invention is concerned with fluid mechanics devices such as fluid-flow control valves; piston and cylinder devices; fluid flow restrictors; fluid reservoirs and fluid-flow manifolds. More particularly, the invention relates to fluid mechanics devices made up of or largely comprising assemblies or stacks of wafer-like components, and the invention envisages the provision of either complete devices (such as valves or piston or cylinder devices) or of kits of components (especially the wafer components) which can be assembled into such devices.

It is to be understood that the term "fluid" is used throughout this specification to include both gas and liquid, so that both pneumatic and hydraulic assemblies are envisaged. However, some of the specific embodiments which are hereinafter described are intended to be primarily used as pneumatic devices.

In the specification of U.K. Patent No. 1 445 303, there is described a fluid control valve made from a series of transparent wafer components assembled into a stack and held together in the stack by bolts passing through all the components. The device is intended to be used for teaching purposes, which is why the components are transparent, but there is no provision for sealing between the wafer components themslves (static sealing) or between the components and the valve rod (dynamic sealing). Moreover, the components have little versatility and it is only envisaged that they will be formed into a valve.

Specification FR 2343946 discloses a valve comprising series of wafer components which can be assembled into a stack and wherein in one face of each wafer, there is an outer recess to receive a resilient ring seal for forming a static seal between that wafer component and the opposite face of a next adjacent wafer component, and an inner recess to receive a resilient ring seal for forming a static seal between that wafer component and a static valve sleeve. The wafer components also each have a mounting ring spaced from but connected to a flange in which the inner and outer recesses are formed, and the inner sealing ring of the first wafer component engages with an end face of the mounting ring of the next adjacent wafer component.

The present invention also employs wafer-like components, which can be assembled into a stack to produce a fluid mechanics device, but the components in accordance with the invention are formed so that they provide any static and/or dynamic seals which will enable the device to be used in commercial applications and at the same time, enable the components to be assembled in a variety of ways, hence giving versatility to the set of components. In particular the wafer components are not "handed" and this facilitates assembly of the components even by unskilled persons, which makes the invention particularly useful for educational purposes.

According to this invention a fluid mechanics device comprises a plurality of wafer components assembled into a block, in which at least a first one of the wafer components has an axial port extending through it from one face to the opposite face; a radial port communicating with the axial port and extending to one edge of the wafer, and at least one resilient ring seal forming a static seal between the first wafer component and a mating face of another of the wafer components in the block, and is characterised in that there are two concentric annular recesses in each face of the wafer, each inner recess being open on its inside into the axial port, the two outer annular recesses being of the same dimensions and providing alternative locations for the static ring seal, and the two inner annular recesses being of the same dimensions and providing alternative locations for a dynamic or static resilient ring seal operative between the wafer and a valve member or piston rod which is movable relatively to the axial port.

The first wafer component is common to all the devices which can be made by use of the invention, some of which will be hereinafter described. Essentially, it provides a communication between two ports, one axial and one radial, but the arrangement of the two concentric recesses in each face permits the fitting of a) static seals between the mating faces of wafer components, and b) dynamic seals with rods sliding in the axial port. It also permits the end of a cylinder to be located in the outer concentric recess at one side of the wafer.

In possible arrangements, the fluid mechanics device may include, in addition to one or more first wafer components, at least one second or third or fourth wafer component as defined below.

A second wafer component has a large axial bore extending through it from one face to the opposite face, and an annular recess in at least one face of the wafer open on its inside into the large axial bore, the outside diameter of the or each annular recess being substantially equal to the outside diameter of the outer concentric recess in the first wafer component.

A third wafer component has an axial port of substantially the same diameter as the axial port in the first wafer component, extending through the wafer from one face to the opposite face and two concentric annular recesses in each face of the wafer, of substantially the same diameters as the respective concentric recesses in the first wafer component, the inner recess being open on its inside into the axial port.

A fourth wafer component has an axial port of at least the same diameter as the axial port in the first wafer component, extending from one face of the component part way only through that component, there being an annular recess of substantially the same diameter as one of the outer concentric recess in the first component, formed only in that face of the wafer component where the axial port is open.

The second wafer component can be used for example threaded over a cylinder with its end located in an outer concentric recess of a first wafer component with a resilient ring fitted into and projecting from a peripheral groove in the cylinder engaging in the outer concentric recess of the first wafer, so that the second wafer traps the projecting part of the resilient ring and thereby secures the cylinder to the first wafer.

The third wafer component can be used for example sandwiched between two first wafer components to separate their radial ports; alternatively it can be used at the end of a stack of components to provide for the passage of a rod through the end of the stack. The fourth wafer component can be used to close the end of the axial port through a stack of wafer components.

According to a preferred feature of the invention a fluid control valve member is located in the axial port of the first wafer component. The valve member may comprise a valve rod or stem formed with a cut-out in one part of its periphery to provide a communicating passage when the cut-out is aligned with a dynamic seal between two radial ports, but arranged to block that dynamic seal when a full diameter part of the rod or stem is aligned with the seal, or the valve member may comprise a rod or stem formed with a tapering portion to co-operate with a small bore in the device to provide a fluid flow restricter, or yet again, the valve member may comprise a ball free to move within the axial port, but adapted to seal on a sealing ring located in one of the inner concentric recesses.

According to a further preferred feature of the invention, the fluid-flow device may include a cylinder of such inner and outer diameters that one of its ends locates in one of the outer concentric recesses of the wafer components, the device including two such wafer components receiving respective ends of the cylinder.

It is preferred that the or at least some of the wafer components is or are transparent or translucent.

The invention also comprehends a kit comprising at least two first components; at least one of each of the second, third and fourth components, at least one cylinder adapted to be located at its ends in the outer concentric recesses of the first components and at least one valve member.

The invention will be better understood from the following description of components and fluid-flow devices which are described here by way of examples only, and with reference to the accompanying drawings, in which.

Figure 4:
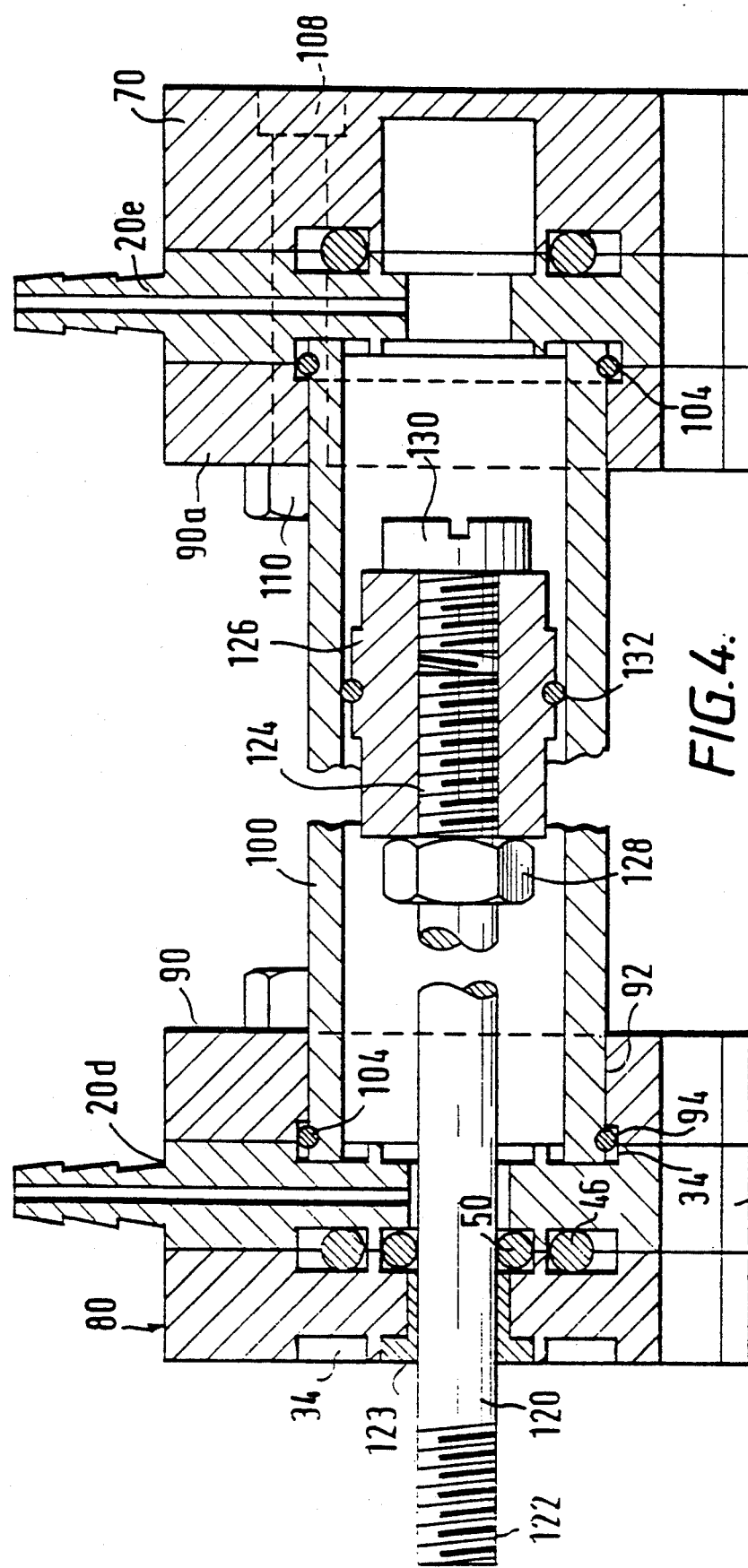
FIG. 4 is a longitudinal section through a piston-and-cylinder device showing first, second, and fourth wafer components.
Figure 5:
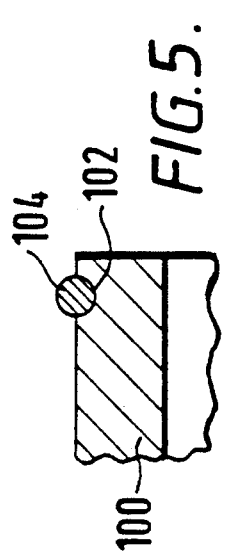
Figure 6:
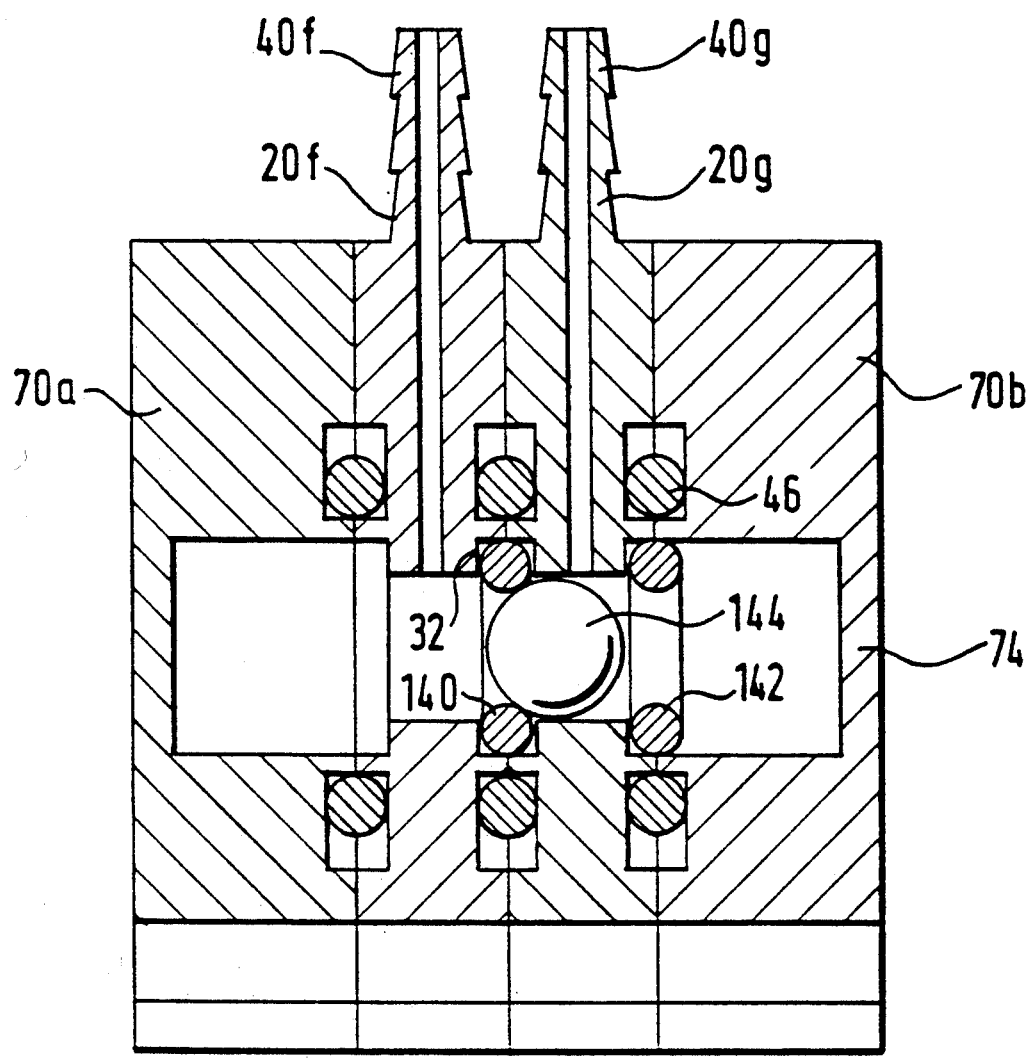
Figure 7:
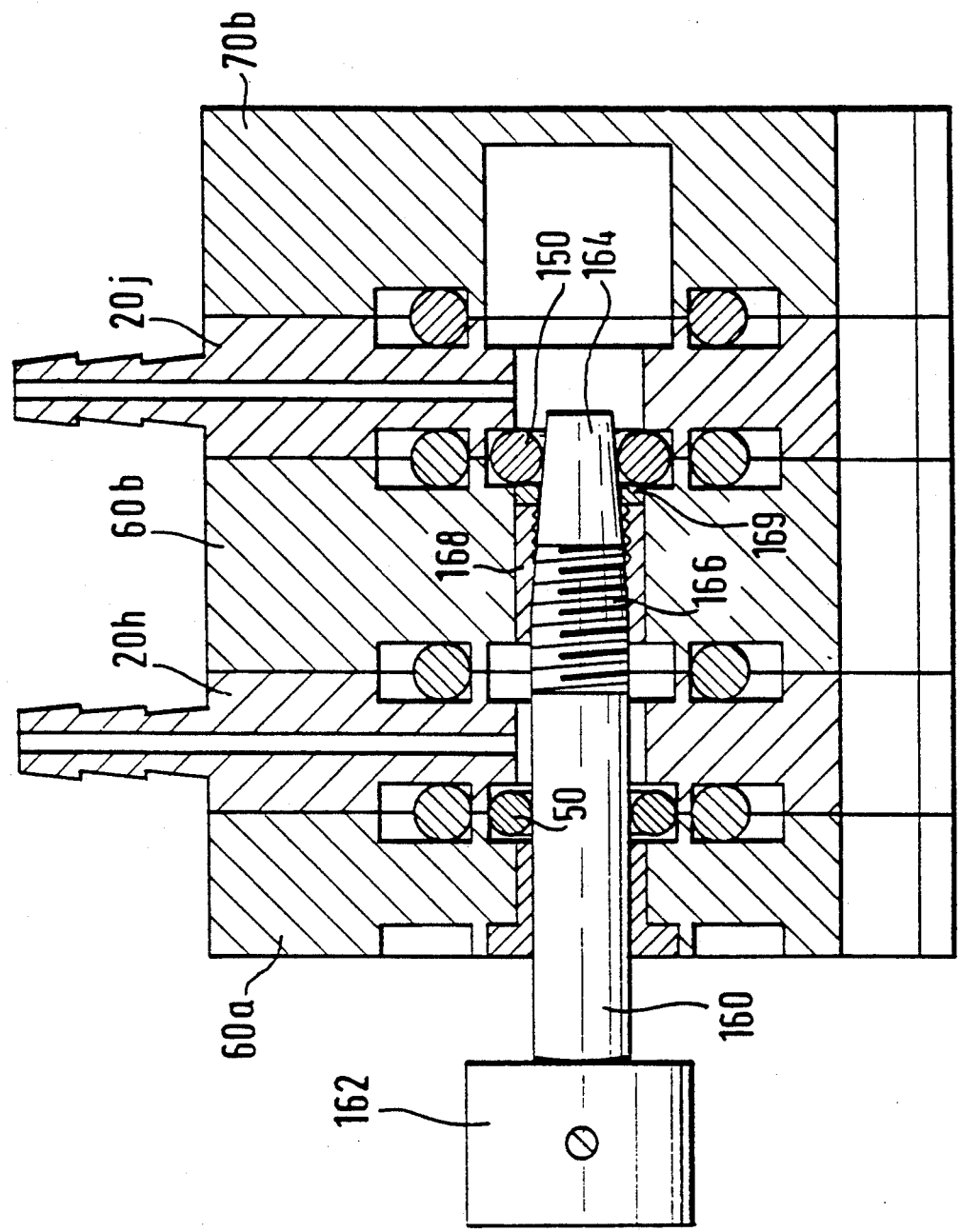

FIG. 5 is a detail view to a larger scale showing the end of the cylinder of FIG. 4, FIG. 6 is a longitudinal section through a non-return valve, and FIG. 7 is a longitudinal section through a restrictor valve, In FIGS. 1 and 2 there is illustrated a basic wafer component 20 which is referred to as a first wafer component; this component being present in all the fluid mechanics devices described hereinafter.

Essentially, the component 20 is moulded in rigid transparent plastics material and it is in the form of a square thick wafer with flat parallel faces 22 and 24. In this specific example, the component 20 is 27 millimeters square and 5 millimeters thick. It will be observed that it has: rounded corners 25; four clearance holes 26, each extending through the wafer from one face to the opposite face, one clearance hole being adjacent to each corner, and three large T-slots 28 each of which extends through the wafer from one face to the opposite face, one T-slot opening into each of three edges of the component.

The first wafer component has a central circular axial port 30 formed through it from one face 22 to the opposite face 24. This axial port is an important feature of the invention, because in addition to constituting a fluid port, it also provides a bearing housing for one of a series of possible operating devices which will be hereinafter described. An inner concentric recess 32 is formed in each face of the wafer component around the axial ports 30, and it is to be noted that the inside of this recess is open into the axial port 30 (see FIG. 2). In the specific example, the diameter of the axial port 30 is 5 millimeters and the diameter of each inner recess 32 is 7 millimeters. An outer concentric recess 34 is formed in each face of the component 20 and in the specific example, the outside diameter of each of the outer recesses 34 is 15 millimeters. The inside diameter of each outer recess 34 is only slightly greater than the outside diameter of the concentric inner recess 32, so that a narrow circular lip 36 separates the two recesses in each face of the components; in the specific example, this lip 36 is only approximately 0.5 millimeters wide. The depth of each of the recesses 32 and 34 from the respective face 22 or 24 of the component in the specific example is approximately 1 millimeter leaving a 3 millimeters thick portion of the wafer between opposite recesses.

The first component is completed by a radial port 38 which extends from the central axial port 30 to one edge of the wafer and then out through a pipe adapter 40 which extends from that edge of the wafer, the pipe adapter having three part conical sections joined end-to-end to facilitate the securing of a flexible pipe (not shown) on its exterior. Such pipe adapters are known in various fluid-flow devices. In the specific example the radial port has a bore of approximately 1 millimeter diameter.

Figure 2:
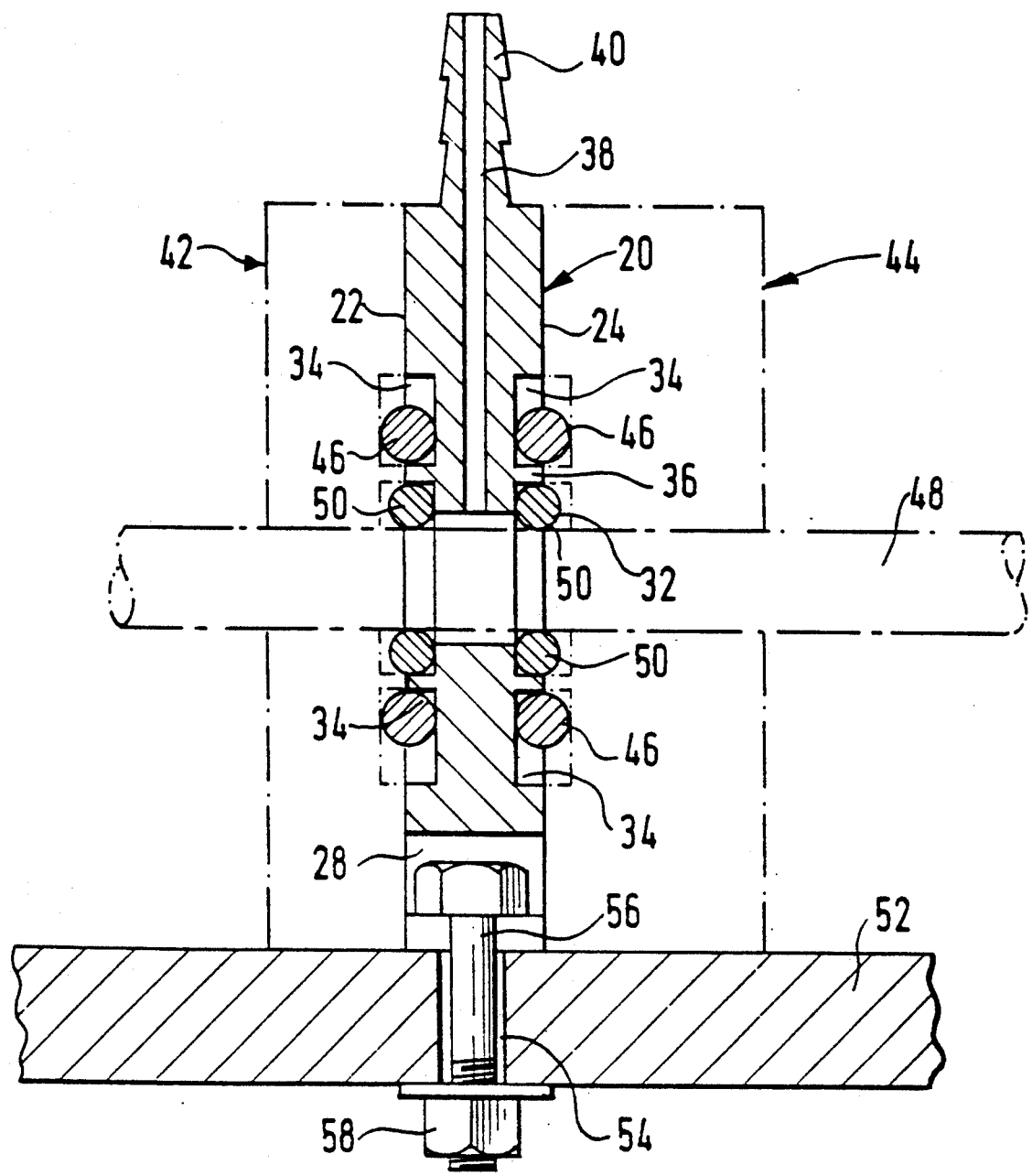
FIG. 2 is a vertical section through the first wafer component shown in FIG. 1, but also illustrating certain sealing arrangements and the manner of mounting the components.

In order to understand how the first wafer component 20 is employed in an assembly which comprises a fluid-flow device, reference will be had to FIG. 2, where in addition to the first wafer component 20, there is indicated the location of two further wafer components 42 and 44, these being shown in chain dotted lines. As will appear hereinafter, the wafer components which can be used in association with the first wafer components are generally of the same external dimensions as the first wafer components—though end cap components are thicker—and although they vary in detail, some of these additional wafer components are formed with a central axial port of the same bore size as the central axial port 30 formed through the first wafer component, and with inner and outer concentric recesses around the central port, the inner recesses opening into the central axial port, in the same way as the recess 32 in the first wafer component. For the purpose of illustration in FIG. 2, it is assumed that the components 42 and 44 have such concentric annular recesses in the faces which abut face-to-face with the faces 22 and 24 of the first wafer component 20.

In practice, the stack may comprise more than three wafer components, but in any event, all the wafer components of the stack are eventually secured together by bolts (not shown in FIG. 2) passing through the clearance holes 20 and engaging either with nuts, or with screw threaded inserts provided in the clearance holes 26.

A rubber "O" ring 46 is provided in each of the outer concentric recesses 24 of the first wafer component 20. As seen in FIG. 2, this "O" ring 46 is a tight fit around the narrow lip 36, and is capable of being received within the outer concentric recess 34, but the thickness of the "O" ring is such that it projects from the face 22 or 24 of the wafer component 20. Consequently, when the additional wafer component 42 or 44 is pressed into face-to-face engagement with the face 22 or 24 of the first component 20, the "O" ring 46 becomes slightly compressed between the bottoms of the two facing recesses 34 in the mating wafer components, and this produces a static seal against the egress of fluid, from the axial port passing through the centre of the stack of wafer components at the interface between two wafer components. The provision of this type of static seal is important, where the fluid-flow control device is to be used for commercial purposes.

Also by reference to FIG. 2, it will be seen that a cylindrical rod 48 extends through the axial port 30 of the first wafer component 20 and the aligned axial ports of the additional wafer components 42 and 44. Again, the rod 48 may take various forms as will hereinafter appear. It is a clearance fit within the central axial ports 30 of the various components. Dynamic seals for the rod 48 are formed by rubber "O" rings 50 which are located in the inner concentric recesses 32. As is apparent from FIG. 2, each of these rings 50 projects into the axial port 30, to an extent that it is able to grip on the periphery of the rod 48, thereby forming a dynamic seal with the rod 48, because the latter is able either to slide or to turn within the "O" ring seals 50. The ring seals 50 may be contained entirely within the recess 32 of the first component 20, or as illustrated in FIG. 2, they may be contained partly within the recess 32 of the component 20, and partly within the corresponding and mating recess of one of the additional components 42 and 44.

It is a significant feature of the first component 20, that two concentric seals are provided in the concentric recesses 32 and 34. Moreover, these seals are separated by the lip 36, so that each can be constituted by a separate "O" ring 46 or 50.

Also in FIG. 2, there is illustrated a base board 52 formed with a clearance mounting hole 54 for the reception of a hexagon headed bolt 56, the head of which engages in one of the T-slots 28 of the first component 20. With the head of the bolt 56 thus engaged in one of the T-slots, and the stem of the bolt passed through the clearance hole 54, the first wafer component 20 can be secured to the base board 52, by a nut 58, since when the latter is tightened on the bolt 56, the head of the bolt pulls the component 20 tightly into engagement with the top surface of the board 52. It will be appreciated, that since the T-shaped slots 28 are provided in three edges of the component 20, there is flexibility for the arrangement of the component on the board 52, and in particular, the pipe adapter 40 may be arranged to extend either vertically upwards as illustrated in FIG. 2, or to one side, if the component 20 is turned through 90° from the position illustrated in FIG. 2.

It is to be understood, that similar T-slots are provided in other wafer components, so that the fixing bolts may be used in any of the wafer components, as is most convenient for securing the complete fluid mechanics device to a mounting board.

Figure 3:
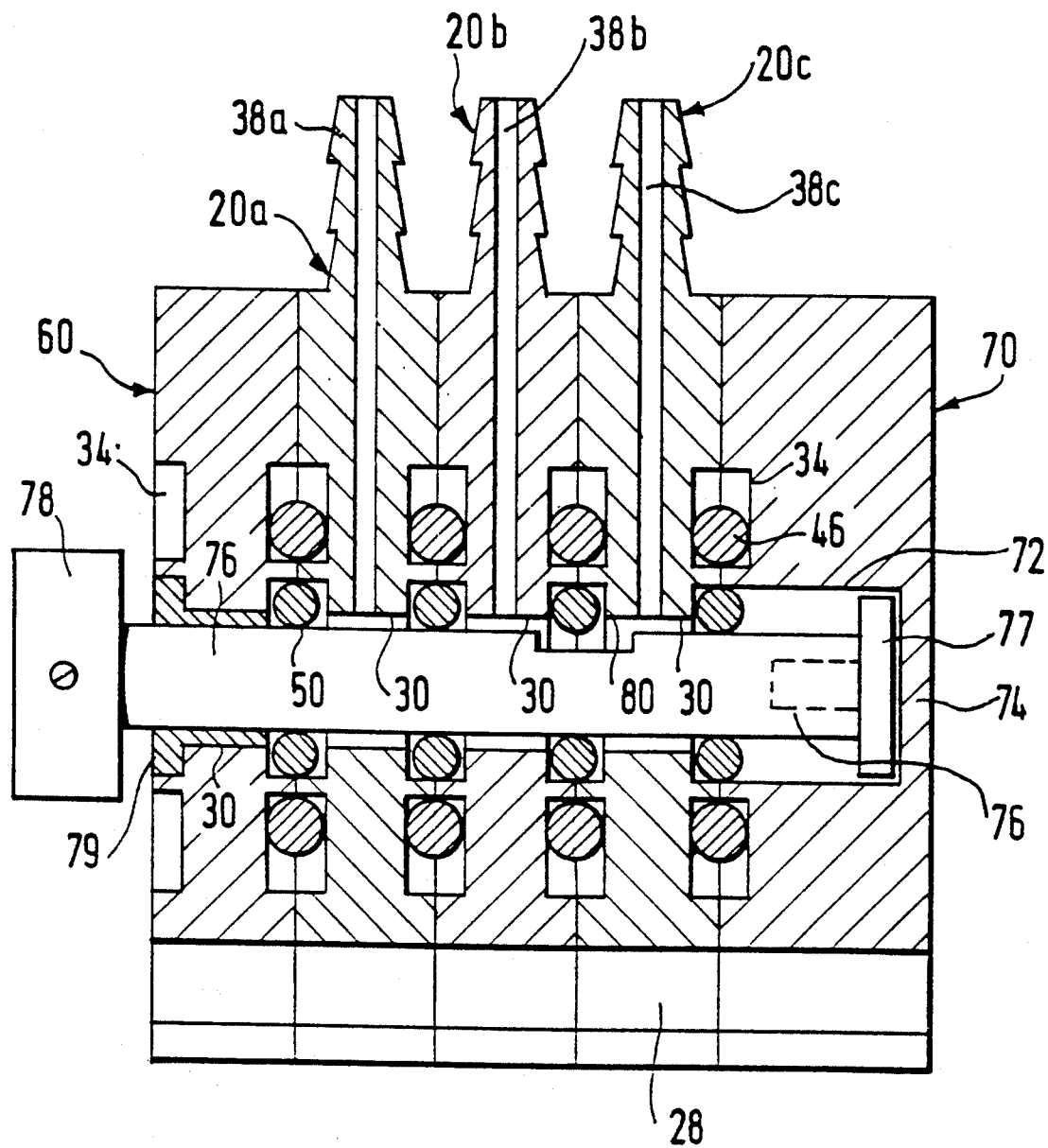
FIG. 3 is a longitudinal section through an on/off fluid-flow control valve, showing first, third, and fourth wafer components.

Turning now to FIG. 3, there is illustrated a fluid control valve of the general kind, in which fluid enters through a port and is able to be diverted to one of two exit ports. The manner in which this is achieved using wafer components in accordance with the invention, will appear from the following description.

Three first wafer components 20a, 20b and 20c are assembled into a stack in the face-to-face arrangement which has previously been described, and with rubber "O" ring seals 46 located in the outer concentric recesses 34, to form static seals between the first wafer components 20a, 20b and 20c. As illustrated in FIG. 3, these first wafer components are assembled so that all their pipe adapters 40 extend from one face of the stack, but in practice, the first wafer components may be turned with respect to each other, so that the pipe adapters project from different faces (e.g., the pipe adapter 38b may project from one face of the stack, with the pipe adapters 38a and 38c projecting from the opposite face or from one of the two adjacent faces).

An additional wafer component 60 is arranged in face-to-face contact with the first wafer component 20a, and this component 60 is of a different type, which is referred to herein as a third wafer component. In essence, the third wafer component is very similar to one of the wafer components 20, in that it is made of transparent plastics material, and it has the same general shape as the first wafer components illustrated in FIGS. 1 and 2, in particular, being formed with the central axial port 30, and the inner and outer concentric annular recesses 32 and 34 in each of its opposite faces. Moreover, the third wafer component 60 is formed with T-slots 28, and the clearance holes 26. Where the wafer component 60 differs from the first wafer component 20, is that it is not formed with a radial port such as the port 38, nor is it provided with a pipe adapter. Consequently, unlike the first wafer component, the component 60 is not adapted to provide a communication between a radial and an axial port. In most instances, it will be used in an end stack situation, such as that illustrated in FIG. 3, where it is at the lefthand end of the stack of five wafer components.

At the righthand end of the stack of components shown in FIG. 3, there is a fourth wafer component 70, which again, is very similar to the first wafer components, in that it is of the same general dimensions, it is made of transparent plastics material, and it is formed with the T-slots 28 and the clearance holes 26. However, it will be observed that the fourth wafer component 70 is somewhat thicker than the first and third wafer components 20 and 60, and that the axial port 72 formed in the component 70 does not extend completely through the component, the outer end of the port 72 being closed by a wall 74. Hence, the port 72 is in the nature of a blind bore but it is somewhat larger in diameter than the axial port 30 in the first wafer component so that there is no inner recess. Moreover, the fourth wafer component 70 is not provided with a radial port nor with a pipe adapter such as the adapter 40 used on the first wafer component. It is however formed with an outer annular recess 32 in the inside face only. The outer face of the fourth component 70 is quite plain and flat.

As illustrated in FIG. 3, the recessed face of the fourth component is in face-to-face contact with the first wafer component 20c, and there is a static seal between the components 20c and 70, formed by the "O" ring 46.

What is not illustrated in FIG. 3 is the method of securing the five wafer components 60, 20a, 20b, 20c and 70 together in the stack. For this purpose, internally threaded metal bushes are force fitted into the clearance holes 26 in the third wafer component 60, and headed screws extend through the stack of components from the righthand end, the heads engaging with the outer righthand face of the fourth wafer component 70, and the screw threaded shanks engaging in the internally screwed bushes inserted in the third wafer component 60. It will be appreciated, that when these screws are tightened, the stack is held together and the static sealing rings 46 are placed under compression. Also, the T-slots 28 are in alignment and extend throughout the length of the stack, which facilitates fitting the device onto a board using bolts such as that illustrated at 56 in FIG. 2.

The valve illustrated in FIG. 3 is completed by a valve rod 76, which is a metal rod fitted at its lefthand end with a knob 78 and at its righthand end with a headed rivet or screw fitted into the end of the shank 76. The head of the rivet is able to slide in the bore 72 of the component 70. The outside diameter of the shank of the valve rod 76 is such that it is a tight fit within the dynamic seals formed by the inner "O" rings 50, and therefore when it is inserted into the aligned central ports 30, it engages in the ring seals 50. Alsoi, a small metal bush 79 pressed into the bore 30 of the third wafer component 60 (and with its head located in the recess 32 on the outside of that component) acts as a slide bearing for the rod 76.

A flat 80 is milled or otherwise formed in the stem of the rod 76, and as shown in FIG. 3, when the rod 76 is at the righthand end of its permitted motion, where it engages with the wall 74 in the fourth wafer component 70, this flat 80 bridges the dynamic seal 50 between the components 20b and 20c. Thus, a communication is provided between the ports 38b and 38c, via the inner ends of those ports, and the cut-out formed by the flat 80 in the rod 76. On the other hand, the port 38a in the first wafer component 20a is isolated from the ports 38b and 38c, by the dynamic seal 50 provided between the wafer components 20a and 20b, since that seal is engaging on a full circumference of the rod 76. If the pipe attachment 40 appertaining to the wafer component 20b is connected to a source of fluid under pressure, and the port 38c is connected to a pipe leading away from the valve, then in the position illustrated in FIG. 3, the fluid is able to flow in through the port 38b, and out through the port 38c.

If the valve rod 76 is then moved to the left, until the head of the rivet 77 engages with the righthand seal 50 the cut-out formed by the flat 80 in the valve rod is brought into a position where it bridges the dynamic seal 50 between the components 20a and 20b, but in this position, the port 38c is isolated from the other ports by the dynamic seal 50 located between the components 20b and 20c. The fluid is then able to flow through the port 38b and out through the port 38a. Consequently, by moving the valve rod 76 between its two positions, it is possible to supply fluid from the one supply out through either of the outlet ports 38a and 38c.

It will be appreciated that more complicated valve arrangements can be devised. For example, there may be more than two outlets, and indeed more than two inlets, it being only necessary to arrange the flat or flats on the valve stem, so that by axial movement of that valve stem within its dynamic seals it is possible to create the necessary passage ways between radial ports as required in the operation of the valve. Sliding valve rod valves are in themselves well known and it is not therefore necessary to describe all the possible arrangements, but it will be appreciated that by using three types of components, namely the first, third and fourth wafer components in various arrangements, a wide variety of valves can be provided.

FIGS. 4 and 5 illustrate a hydraulic or pneumatic piston-and-cylinder device. Pneumatic piston and cylinder devices are of course well known in themselves, and the essential features of such a device are incorporated in the device illustrated in FIGS. 4 and 5. However, use is made of some of the wafer components of the type provided by the invention.

Figure 1:
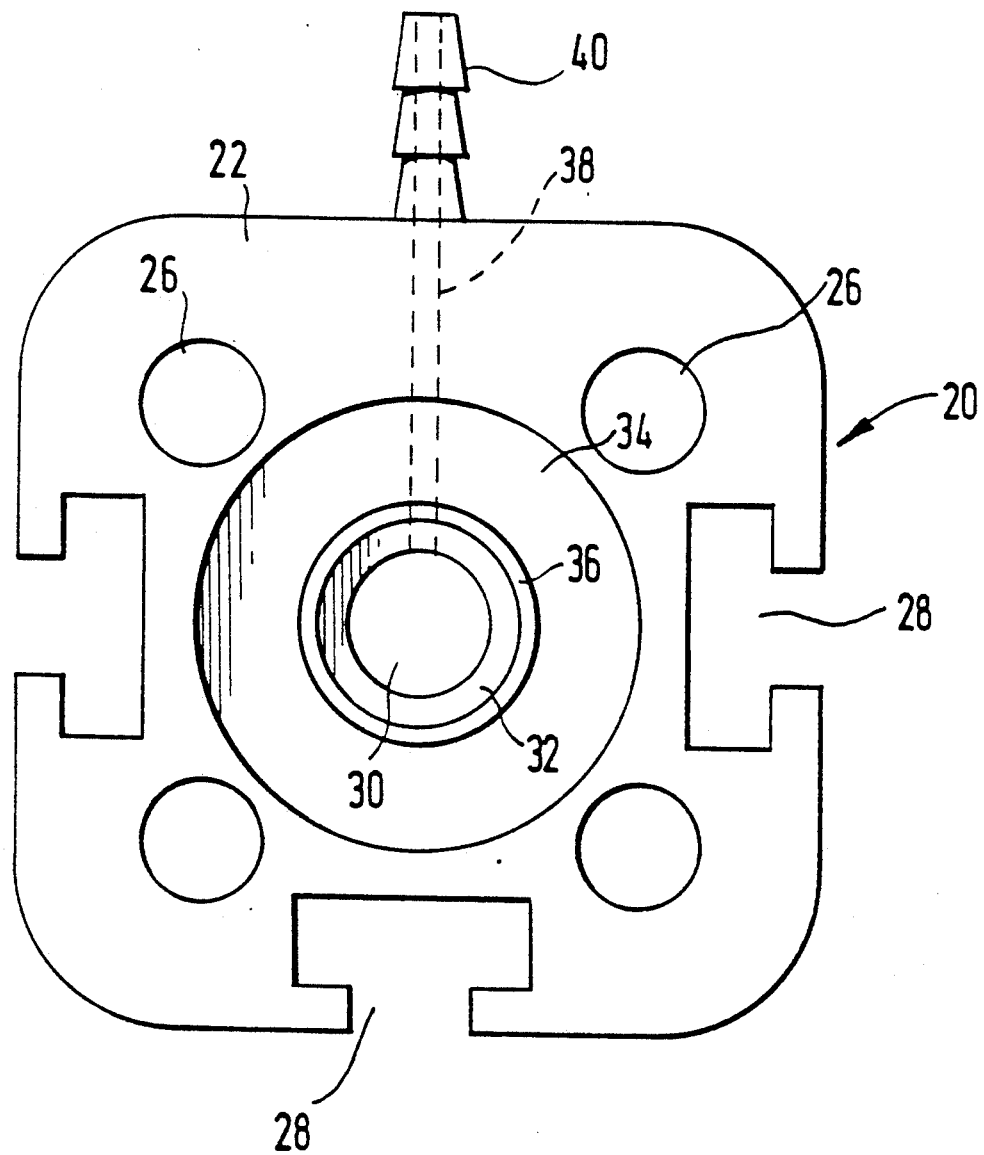
FIG. 1 is a front view of a first wafer component.

Referring firstly to FIG. 4, at the lefthand end of the device, there is a first wafer component 20d, which has all the features of the first component illustrated in FIGS. 1 and 2, so that it is unnecessary to describe it in detail. At the lefthand side of the first wafer component 20d, there is an additional wafer component 80, which is of a type referred to herein as a third wafer component. Generally, the construction of the third wafer component 80 is identical with that of one of the first wafer components 20, particularly in respect of its general dimensions and the provision of outer and inner concentric recesses 34 and 32, and the third wafer component 80 only differs from the first wafer component 20 in that it is not provided with a radial port nor does it have the pipe connection 40 of the first component.

As illustrated in FIG. 4, there is a static seal 46 between the two components 80 and 20d, and this is of the type previously described. However, in this particular instance, the third wafer component 80 acts as an end cover for a short stack of components at the lefthand end of the device, and consequently there are no sealing rings in the concentric recesses 32 and 34 at the lefthand outer face of the third component 80.

On the righthand side of the first wafer component 20d there is another wafer component 90 referred to as a second wafer component. Again, this has the same external dimensions as one of the first wafer components, and is made in similar transparent plastics material. It also has features common to the other wafer components, such as the T-slots 28 and the clearance holes 26. However, it is not formed with a radial port, nor does it have a pipe connector for a radial port. Moreover, instead of the relatively small diameter axial port 30 which is found in the first wafer component 20, there is a relatively large bore 92, and at the lefthand face as seen in FIG. 4, a shallow annular recess 94, open on the inside into the large diameter bore 92, the outside diameter of the recess 94 being the same as the outside diameter of the outer concentric recess 34 in one of the other wafer components. Thus, when the stack of three wafer components 80, 20d and 90 is assembled as illustrated in FIG. 4, the annular recess 94 in the fourth wafer component 90 is in register with the outside of the outer concentric recess 34 at the righthand side of the first wafer component 20d.

A transparent plastics cylinder 100 is provided and this is simply in the form of a tube, the outside diameter of which is a sliding fit within the large bore 92 of the second wafer component 90. At each end, the cylinder 100 is formed with a shallow peripheral groove 102 (see FIG. 5) and a rubber "O" ring 104 is received in this groove 102, and projects externally from the cylinder 100.

Reverting to FIG. 4, it will be seen that the end of the tube 100 fits into the outer recess 34 in the component 20d and the ring 104 is received within the shallow recess 94 in the fourth wafer component 90. Thus, when the component 90 is fitted to the component 20d, it prevents axial motion of the cylinder 100 to the right as seen in FIG. 4, and in other words, it holds the cylinder 100 to the assembly comprising the three components 80, 20d and 90 and it acts as a seal for the cylinder.

At the righthand end of the cylinder 100, there is a further stack of wafer components, comprising from left to right a second wafer component 90a, identical with the component 90, but turned to face in the opposite direction, a first wafer component 20e, and an end cap in the form of a fourth wafer component 70.

At the righthand end, FIG. 4 also illustrates the method by which the stacks of wafer components at each end of the cylinder are held together. A countersunk headed bolt 108 received in one of the bores 26 (which is correspondingly counterbored to receive the head of the bolt) extends through the stack, and there is a nut 110 on the inner end of this bolt. In other words, there are four such bolts and nuts at each end of the piston-and-cylinder arrangement.

A piston rod 120 is generally of the same outside diameter as the valve rod 76 illustrated in FIG. 3, so that it is able to slide in a dynamic seal provided by the "O" ring 50 between the first and third wafer components at the lefthand end of the cylinder. A metal bush 123 pressed into the port 30 of the component 80 provides a slide bearing for the rod 76. Also, it will be seen that the lefthand end of the piston rod 120 is screw threaded at 122 so that it can be connected to an operating mechanism. Within the cylinder 100, the righthand end of the piston rod 120 is screw threaded at 124 and a plastics cylindrical piston 126 is screwed onto this end portion of the piston rod, the lefthand end of the piston engaging with a lock nut 128. At the righthand end, there is a slotted head screw 130 which also screws into the bore of the piston 126, so that the piston is nipped between the head of the screw 130 and the lock nut 128.

As shown in FIG. 4, the piston has a central portion of slightly larger diameter than its main portion, but in any event, the piston itself is a clearance fit within the bore of the cylinder 100. A rubber "O" ring 132 is received in a peripheral groove in the enlarged central portion of the piston 126, and this "O" ring 132 is a sealing fit within the bore of the cylinder 100 and acts in the manner of a conventional piston ring.

It will be appreciated, that if taking the position illustrated in FIG. 4 for example, air under pressure is admitted through the radial port in the first wafer component 20e, that air pressure is then applied to the righthand side of the piston 126, and consequently the piston is forced to slide to the left. The air in the lefthand side of the cylinder is then forced outwardly through the radial port in the first wafer component 20d, and it does not escape through the ports 30 in the components 80 and 20d, because of the dynamic sealing effect of the "O" ring seal 50 which is located in the inner concentric recesses 32 of those two wafer components. This motion of the piston and piston rod can be then transmitted to any other component connected to the lefthand end of the piston rod. Conversely, if air is admitted through the radial port 38 in the first wafer component 20d, then the piston will be moved towards the righthand end. The movement of the piston is limited in one direction by the engagement of the nut 128 with the righthand face of the first wafer component 20d, and in the other direction by the engagement of the head of the screw 130 with the lefthand face of the first component 20e.

If air is admitted alternately to each of the radial ports, then the piston and its piston rod will be caused to reciprocate within the cylinder 100.

An interesting possibility, is to connect the piston rod 120 to the valve rod 76 of the valve illustrated in FIG. 3, so that the total combination of the cylinder of FIG. 4 with the valve of FIG. 3 becomes a pneumatic actuator.

In FIG. 6, there is illustrated a simple non-return valve, which comprises a single stack of wafer components, which from left to right are: a fourth wafer component 70a, a first wafer component 20f, a first wafer component 20g and fourth wafer component 70b. In general, these wafer components are as described with reference to preceding examples, so that it is unnecessary to describe them in detail. It will be noted that there are static seals 46 between each adjacent pair of wafer components.

The pipe adapter 40f forms the inlet port of the non-return valve, and is adapted to be connected to a source of air under pressure. The adapter pipe 40g of the wafer component 20g forms the outlet of the non-return valve, and is intended to be connected to an outlet pipe.

Within the inner concentric recesses 32 of the wafer components 40f, 40g and 70b, there are "O" rings 140 and 142, which are of rather larger cross section than the "O" rings 50 used as dynamic seals. Consequently, they project further into the axial port 30 of the components.

The valve is completed by a metal ball 144 which is located in the axial port 30 of the wafer component 20g between the two "O" rings 140 and 142. As will be observed from FIG. 6, the ball 144 is quite free to move within the port 30, and between the two rings 140 and 142. It will also be observed however, that it is not able to pass through the bore of one of the rings 140 and 142.

In operation, when air under pressure is admitted through the radial port of the first wafer component 20f, it blows the ball 144 to the right, where it rests against the inside of the ring 142. The air is then able to flow quite freely out through the radial port 38 of the first wafer component 20g. However, if for some reason, the air flow is reversed, air pressure will build up in the axial ports 30 of the components 20g and 70b on the righthand side of the ball 144, and this will force the ball 144 into the position illustrated in FIG. 6, where it rests against the ring 140, and forms a seal with that ring. Consequently, air is not permitted to flow out through the inlet port of the first wafer component 20f. By the simple expedient of providing the "O" rings 140 and 142 therefor, this stack of four wafer components is made into a non-return valve.

This valve could be spring loaded, by fitting a compression spring between the ball 144 and the end wall 74 in the righthand end component 70b.

Turning now to FIG. 7, there is illustrated a fluid-flow restrictor which again can be produced using wafer components in accordance with the invention. In this construction, five wafer components are assembled into a stack, which comprises from left to right: a third component 60a; a first component 20h, a third component 60b (thicker than the third component 60a); a first component 20j and a fourth component 70b. Since these components are constructed as described with reference to previous examples, it is not necessary to describe their construction. It is to be noted however that there are static seals provided by "O" rings between the mating faces of all five wafer components. In addition, there are dynamic seals 50 provided between the first component 20h and the components on the left hand side of that first component.

For the purpose of this construction however, a somewhat thicker "O" ring 150, is fitted in the mating inner concentric recesses 32 of the components 60b and 20j. A restrictor spindle 160 made of metal, is generally of substantially the same diameter as the valve rod 76 shown in FIG. 3, and is received in the dynamic seals 50. In addition a metal bush 161 pressed into the port 30 in the component 60a provides a journal bearing for the spindle. On the outside of the lefthand end of the assembly, a knob 162 is secured on the spindle 160. Towards its righthand end, the spindle 160 tapers as indicated at 164 and there is an externally screw threaded portion 166 of the spindle, which merges into the conical portion 164. This screw threaded portion is engaged in the internal threads of a metal bush 168 pressed into the axial port 30 of the third wafer 60b. A plastics washer 169 is located between the righthand end of the bush 168 and the sealing ring 150.

When the knob 162 is turned to rotate the spindle 160, the dynamic seals 50 act as rotary seals as distinct from the sliding seals provided in relation to the valve rod 76 in the arrangement shown in FIG. 3. However, as the spindle 160 rotates, by virtue of its screw threaded engagement in the bush 168, it moves axially, to vary the small annular space between the outside of the tapered portion 164 and the inside of the washer 169.

Air under pressure flowing in through the radial port 38 in the wafer component 20h, can flow through the screw threaded part 166 of the spindle 160, between that part and the bush 168, and it can also flow through any annular space between the tapering portion 164 and the ring 150, and thence out through the radial port in the first wafer component 20j. However, as the spindle travels further to the right as seen in FIG. 7, the annular space between the tapering portion 164 and the washer 169 reduces, thereby throttling or restricting the air flow, until eventually, the tapering portion 164 engages tightly with the washer, and the restrictor is then fully closed as shown in FIG. 7.

It will be appreciated, that the devices which can be produced by use of the components provided by the invention are not limited to those which have been illustrated in the drawings. For example, an air reservoir can be provided by a construction similar to that shown in FIG. 4, excepting that the piston and piston rod are omitted, and the lefthand end of the assembly is closed by a fourth component 70 in similar fashion to the righthand end.

I claim:

1. A fluid mechanics device comprising a plurality of wafer components assembled into a block, in which at least a first one of the wafer components has an axial port extending through it from one face to the opposite face; a radial port communicating with the axial port and extending to one edge of the wafer; and at least one resilient ring seal forming a static seal between the first wafer component and a mating face of another of the wafer components in the block, characterized in that there are two concentric annular recesses in each face of the wafer, each inner recess being open on its inside into the axial port, the two outer annular recesses being of the same dimensions and providing alternative locations for the static ring seal, and the two inner annular recesses being of the same dimensions and providing alternative locations for a further resilient ring seal operative between the wafer and an axially movable actuator movable relatively to the axial port.

2. A fluid mechanics device according to claim 1 wherein a second wafer component in the block has a large axial bore extending through it from one face to the opposite face, and an annular recess in each face of the wafer open on its inside into the large axial bore, the outside diameter of each of the two annular recess being substantially equal to the outside diameter of the outer concentric recesses in the first wafer component.

3. A fluid mechanics device according to claim 1 or claim 2, wherein a third wafer component in the block has an axial port only of substantially the same diameter as the axial port in the first wafer component, extending through the wafer from one face to the opposite face and two concentric annular recesses in each face of the wafer, of substantially the same diameters as the respective concentric recesses in the first wafer component, the inner recess being open on its inside into the axial port.

4. A fluid mechanics device according to claim 1 wherein a fourth wafer component in the block has an axial port extending from one face of the component part way only through that component, there being an annular recess of substantially the same diameter as one of the outer recesses in the first component formed only in that face of the wafer component where the axial port is open.

5. A fluid mechanics device according to claim 1 in which the axially movable actuator is a valve rod formed with a cut-out in one part of its periphery to provide a communication passage when the cut-out is aligned with a dynamic seal between the two radial ports of two wafer components in the block, but arranged to block that dynamic seal when a full diameter part of the rod is aligned with the seal.

6. A fluid mechanics device according to claim 1 in which the axially movable actuator comprises a rod formed with a tapering portion to co-operate with a small bore in the device to provide a fluid-flow restrictor.

7. A fluid mechanics device according to claim 1 or claim 4 in which the axially movable actuator comprises a ball free to move within the axial port, but adapted to seal on the sealing ring located in one of the inner concentric recesses.

8. A fluid mechanics device according to claim 1 or claim 4 further comprising:
   a cylinder of such inner and outer diameters that its ends locate in one of the outer concentric recesses of two of the wafer components of the block;
   a piston operative within the cylinder and a piston rod connected to the piston and passing through the axial port in at least one of the two wafer components in which the ends of the cylinder are located and engaging in the seal provided by the inner sealing ring in that wafer component.

9. A fluid mechanics device according to claim 1 in which the, or at least some of the wafer components is or are transparent or translucent.

* * * * *